Oct. 7, 1952      C. A. DAVIS      2,613,028
AIR COMPRESSOR FOR USE ON AIRCRAFT
Filed March 19, 1947      2 SHEETS—SHEET 1
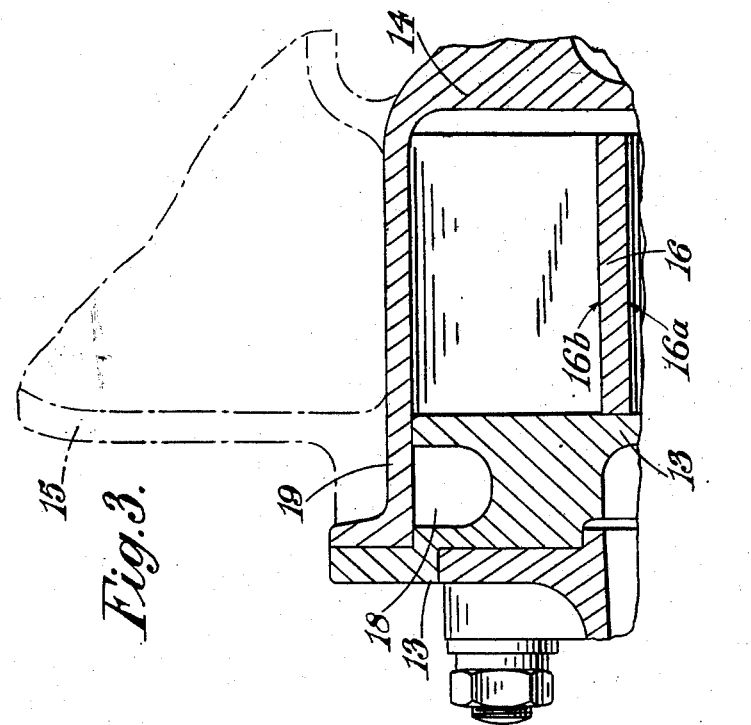
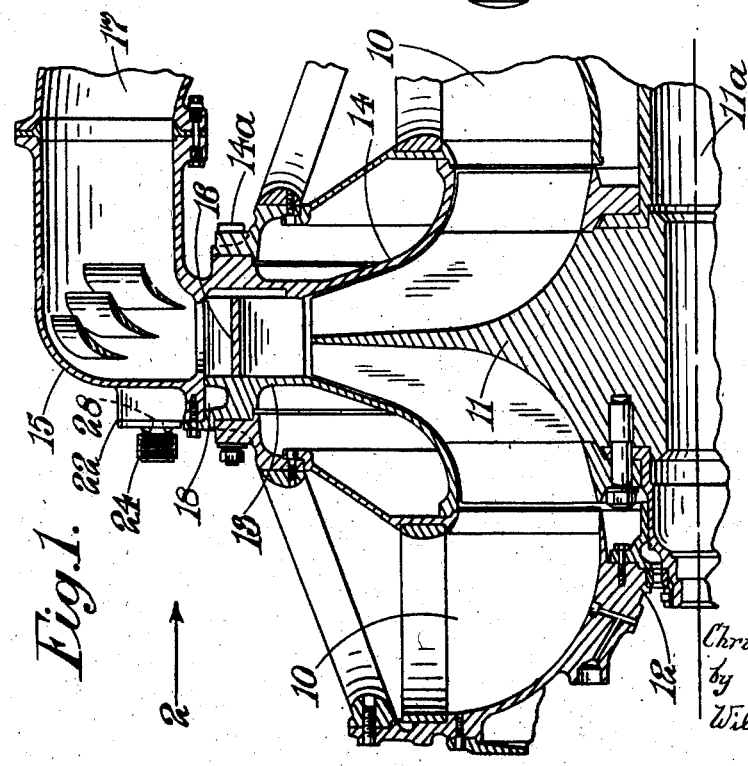
Inventor
Christopher A. Davis
by
Wilkinson & Mawhinney
Attorneys Oct. 7, 1952　　　　　C. A. DAVIS　　　　　2,613,028
AIR COMPRESSOR FOR USE ON AIRCRAFT
Filed March 19, 1947　　　　　　　　　　2 SHEETS—SHEET 2
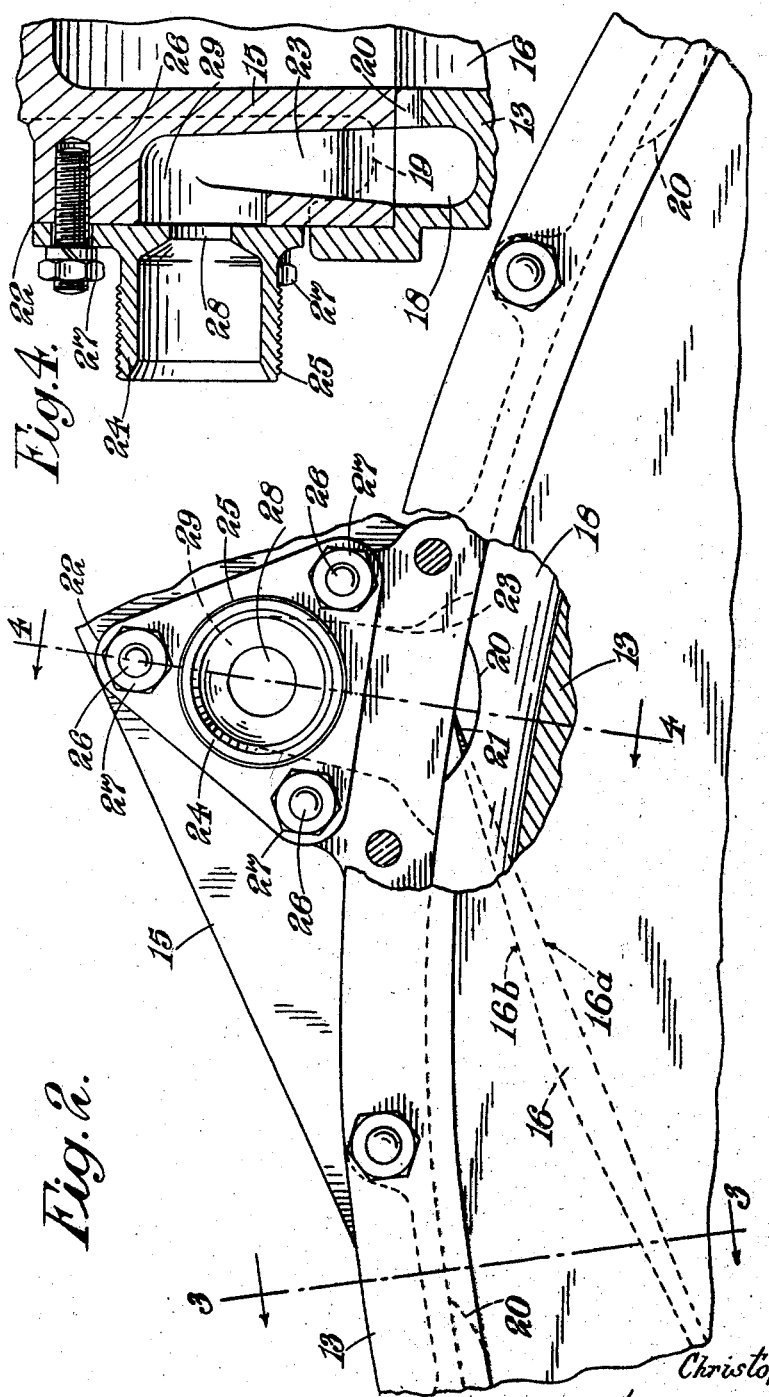
Inventor
Christopher A. Davis
by Wilkinson & Mawhinney
Attorneys Patented Oct. 7, 1952

2,613,028

UNITED STATES PATENT OFFICE 2,613,028

AIR COMPRESSOR FOR USE ON AIRCRAFT

Christopher Ainsworth Davis, Barnoldswick, England, assignor to Rolls-Royce Limited, Derby, England, a British company Application March 19, 1947, Serial No. 735,691
In Great Britain January 8, 1946

4 Claims. (Cl. 230—47)

1

This invention relates to air-compressors, and in particular to such compressors used in gas-turbine-engines. Gas-turbine-engines normally comprise a compressor-system delivering air through main outlets to combustion-equipment in which fuel is burned, the products of combustion, or air heated by combustion, passing through a turbine-system driving the compressor.

When aircraft are required to operate at high altitudes, it is desirable to maintain in the cabin an air-pressure above that of the ambient atmosphere suitable for the occupants, and since the power-unit of the aircraft is provided with an air-compressor for supplying the engine, it has been common practice to tap air off the main compressor delivery with pipe connections to the cabin so as to maintain a suitable pressure therein, or for allied purposes. The arrangement of piping hitherto used is somewhat clumsy and liable to mechanical derangement and the object of this invention is to provide an improved construction for giving a supply of air at a suitable pressure for the cabin or other purposes.

According to the present invention provision is made in a gas-turbine aircraft-engine for effecting an auxiliary tapping of pressure-air from the compressor-system, comprising a circumferential passageway formed in a wall of the compressor-casing, and lying adjacent a pressure-region in the compressor, communication being effected between the passageway and pressure-region through a plurality of ports spaced circumferentially of the groove, and further comprising one or more outlet-connections from said passageway rigidly supported by the compressor-casing. Conveniently the circumferential passageway is formed by the provision of a groove, which may be cast or machined in a wall of the compressor-casing, the groove being closed by a cooperating face on an adjacent wall.

As applied to a centrifugal compressor, the circumferential passageway preferably lies at a radius corresponding to that of the diffuser-space internally of the compressor-casing, and a preferred embodiment may provide for the provision of a plurality of ports arranged to bleed air associated with the boundary-layer of diffuser-blades. For example an advantageous location of the ports is at the trailing edges of the diffuser-blades, bleeding air from upper and lower surfaces (i. e. considering the blades as aerofoils). Conveniently the ports may be crescent or arcuate shape, the effective area lying on each side of the diffuser blade being divided into two parts, the areas of which are selected to give the appropriate

2 bleed from the respective sides of the diffuser-blade.

In the accompanying drawings a preferred embodiment of the invention is shown as applied to a centrifugal compressor of a gas-turbine-engine. In the drawings Figure 1 illustrates generally in sectional elevation the centrifugal compressor, Figure 2 is an enlarged elevation and part sectional view in the direction 2 in Figure 1, Figure 3 is a sectional view on the line 3—3 of Figure 2, and Figure 4 is a sectional elevation on the line 4—4 of Figure 2.

This particular embodiment is applied to a gas-turbine aircraft-engine with a compressor of the centrifugal type; the compressor is shown generally in Figure 1, with the air-inlets 10 and centrifugal impeller 11. The impeller is supported on a rotor-shaft 11A with a bearing generally indicated at 12. The compressor-casing comprises a front portion 13 and a rear portion 14, which has cast integrally with it a plurality of tangential outlet-ducts 15, arranged peripherally of the compressor casing and fed through diffuser-channels defined by diffusser-blades 16. The blades 16 extend outwards in a direction inclined to the radial direction from adjacent the impeller 11 to adjacent the outlets 15 and thus have inwardly-facing surfaces 16A and outwardly-facing surfaces 16B. The main outlet-ducts 15 communicate with the combustion-equipment entry indicated at 17. The compressor-casing portions 13 and 14 are bolted together as at 14A. The general arrangement described above and illustrated in Figure 1 represents a typical compressor-construction to which the invention can be applied.

In Figure 2 the parts enumerated above bear the same references, and in greater detail in Figure 3 there is shown an annular passage 18 formed in the peripheral edge of the forward portion 13 of the compressor-casing. This groove is closed by a circumferential wall 19 (Figure 3) on the compressor-casing portion 14. The groove 18 is preferably formed by casting or machining in the compressor-casing portion 13, and is continuous around the periphery of the compressing-casing, serving to receive pressure-air from the pressure-region of the compressor adjacent the outlet edges of the diffuser-blades 16. Communication with the pressure-region is effected by a number of ports 20, which for convenience of machining are of crescent or arcuate form, one such port being provided, in the manner illustrated in Figure 2 in the region of each diffuser-blade trailing edge tip 21. In this manner the auxiliary pressure-air tapping is effected with substantial uniformity around the periphery of the compressor, and in addition, the crescent-shaped ports lying across the diffuser-blade-tips 21 withdraw boundary-layer from both surfaces 16A, 16B of the trailing edge, and may thereby improve the characteristic of the compressor. As illustrated in Figure 2, the respective areas of the ports 20 lying on each side of the diffuser tips 21 are unequal, greater abstraction being effected from adjacent the inwardly-facing surfaces 16A of the blades.

An outlet-connection from the peripheral groove or channel 18 is effected in the manner shown in greater detail in Figures 2 and 4, where a main compressor-outlet 15 is formed with an integral boss 22, which is cast with a radially extending passage 23, communicating with the peripheral groove 18 formed as described in the compressor-casing portion 13. The outlet-connection proper comprises a union adaptor 24 threaded at 25 to receive the nut of a union-pipe-connection, this adaptor being supported on the boss 22 by studs 26 and nuts and washers generally indicated at 27. The union fitting 24 communicates through a passage 28 with a lateral opening 29 from the radially extending passage 23.

The outlet-connection thus provided constitutes a source of pressure-air which may be ducted to the cabin, or to any other required supply-point in the aircraft or engine. If pressure-air is required at a number of supply-points, a plurality of such outlet connections as illustrated in Figures 2 and 4 may be made; alternatively, according to the quantity of air which is required, e. g. for cabin-pressurization, a plurality of outlet connections may be made for a single supply so that these outlet-connections being equally spaced around the compressor withdraw the air symmetrically therefrom.

It will be appreciated however that since the groove or channel 18 extends around the whole periphery, and is of substantial volume and is supplied through the plurality of ports 20 uniformly spaced around the periphery, a sensibly equal distribution of the air-bleed-off may be obtained even if there is only one outlet-connection to the aircraft system. This feature is important to prevent unbalance of air-flow to the various combustion chambers, each of which is supplied from one of the main outlets 15.

I claim:

1. A centrifugal compressor for a gas-turbine engine comprising an impeller, a casing structure enclosing the impeller, there being a chamber formed in the casing peripherally of and radially beyond the impeller, a plurality of diffuser blades mounted in the chamber to extend outwards in a direction inclined to the radial direction to have each an inwardly-facing surface and an outwardly-facing surface and to form a plurality of diffuser outlet channels, a closed circumferential passageway formed in said casing adjacent the diffuser blades, there being a plurality of circumferentially-spaced ports in the casing to provide communication between the diffuser channels and the passageway, said ports being arranged to open into the diffuser channels one at the trailing end of each of a plurality of the diffuser blades to abstract the boundary layer from the surfaces of the diffuser blades, the area of each port adjacent the inwardly-facing surface of the associated diffuser blade being greater than adjacent the outwardly-facing surface of said diffuser blade, and an outlet connection from said passageway rigidly supported by the compressor casing.

2. A centrifugal compressor as claimed in claim 1, wherein said compressor casing is formed in a plurality of parts rigidly secured together, said circumferential passageway is formed by a circumferential groove in one casing part and is closed by a co-operating face in the second casing part, and each of a plurality of said circumferentially-spaced ports is formed between an arcuate depression in first said casing part and said face of said second casing part.

3. A centrifugal compressor as claimed in claim 2, wherein one of said casing parts which co-operate to provide the circumferential passageway is formed integrally with a series of main compressor outlet connections and also has formed as a duct therein an outlet connection from said circumferential passageway.

4. A centrifugal compressor for a gas-turbine engine comprising an impeller, a casing having two portions lying close to the impeller one on each side thereof and each extending radially beyond the impeller to form therebetween a diffuser chamber which is radially outside the impeller, a plurality of diffuser blades arranged between said two casing portions to divide the diffuser chamber into a plurality of diffuser channels, said diffuser blades having their trailing edges adjacent the peripheral edges of said casing portions and each said diffuser blade being inclined to the radial direction to have an inwardly-facing surface and an outwardly-facing surface, the first of said casing portions having formed in its peripheral edge an outwardly-facing circumferentially-extending groove and a plurality of circumferentially-spaced ports opening at their ends into said grooves and into said diffuser chamber, said ports being arranged to open into the diffuser chamber one at the trailing end of each of a plurality of said diffuser blades, and each arranged in relation to the trailing end of its associated diffuser blade to have a greater area adjacent the inwardly facing surface of the diffuser blade than adjacent the outwardly-facing surface of the diffuser blade, and the second of said casing portions having in one piece therewith a plurality of outlet ducts leading from the diffuser chamber and a circumferential wall engaging over the peripheral edge of said first casing portion to close said groove, and an outlet connection from said groove rigidly supported by the casing.

CHRISTOPHER AINSWORTH DAVIS.

REFERENCES CITED

The following references are of record in the file of this patent:

UNITED STATES PATENTS

| Number | Name | Date |
|---|---|---|
| 974,345 | Benson | Nov. 1, 1910 |
| 2,305,226 | Stalker | Dec. 15, 1942 |
| 2,316,452 | Pfenninger | Apr. 13, 1943 |
| 2,317,723 | Becht | Apr. 27, 1943 |
| 2,342,219 | Price | Feb. 22, 1944 |
| 2,344,835 | Stalker | Mar. 21, 1944 |
| 2,399,865 | Halford | May 7, 1946 |
| 2,435,836 | Johnson | Feb. 10, 1948 |
| 2,453,524 | McMahan et al. | Nov. 9, 1948 |